United States Patent [19]

Scag

[11] Patent Number: 5,117,617
[45] Date of Patent: Jun. 2, 1992

[54] SPINDLE ASSEMBLY

[75] Inventor: Dane T. Scag, Elm Grove, Wis.

[73] Assignee: Scap Power Equipment, Inc., Mayville, Wis.

[21] Appl. No.: 635,921

[22] Filed: Dec. 28, 1990

[51] Int. Cl.$^5$ .................................... A01D 34/68
[52] U.S. Cl. .......................... 56/17.5; 56/DIG. 22; 384/128
[58] Field of Search .............. 56/17.5, 16.7, 255, 56/295, DIG. 17, DIG. 22; 384/607, 619, 128, 420

[56] References Cited

U.S. PATENT DOCUMENTS

| | | | |
|---|---|---|---|
| 2,512,148 | 6/1950 | Gaines | 308/16 |
| 2,684,273 | 7/1954 | Fears et al. | 308/134.1 |
| 2,879,114 | 3/1959 | Bowen | 308/187.2 |
| 3,554,620 | 1/1971 | Dalton | 308/187.1 |
| 3,875,728 | 4/1975 | Bacon | 56/17.5 |
| 3,894,383 | 7/1975 | Weis et al. | 56/17.5 |
| 3,967,438 | 7/1976 | Tombers | 56/113 |
| 4,366,995 | 1/1983 | Kocian | 308/26 |
| 4,478,029 | 10/1984 | Moore et al. | 56/17.5 |
| 4,712,364 | 12/1987 | Oxley | 56/17.5 X |
| 4,784,500 | 11/1988 | Prokop | 384/462 |
| 4,811,992 | 3/1989 | Steiner | 384/128 X |

OTHER PUBLICATIONS

Scag Power Equipment, Inc., Commercial Mower Technical Manual, Sep. 19, 1988, pp. 8, 10, 11, 12.

Primary Examiner—Terry Lee Melius
Attorney, Agent, or Firm—Michael, Best & Friedrich

[57] ABSTRACT

A spindle assembly for the cutter blade of a rotary lawn mower includes a spindle rotatably mounted in a fixed housing by means of a pair of spaced apart tapered roller bearings. Lip seals are provided at the upper and lower ends of the housing and there is a further O-ring seal adjacent the lower housing end. The spindle shaft is maintained within the housing by snap rings and spacers, and the spindle and bearings are lubricated by a heavy oil disposed within the housing. A cutter blade is fixed to the lower end of the spindle and a pulley is fixed to the spindle above the housing.

17 Claims, 1 Drawing Sheet

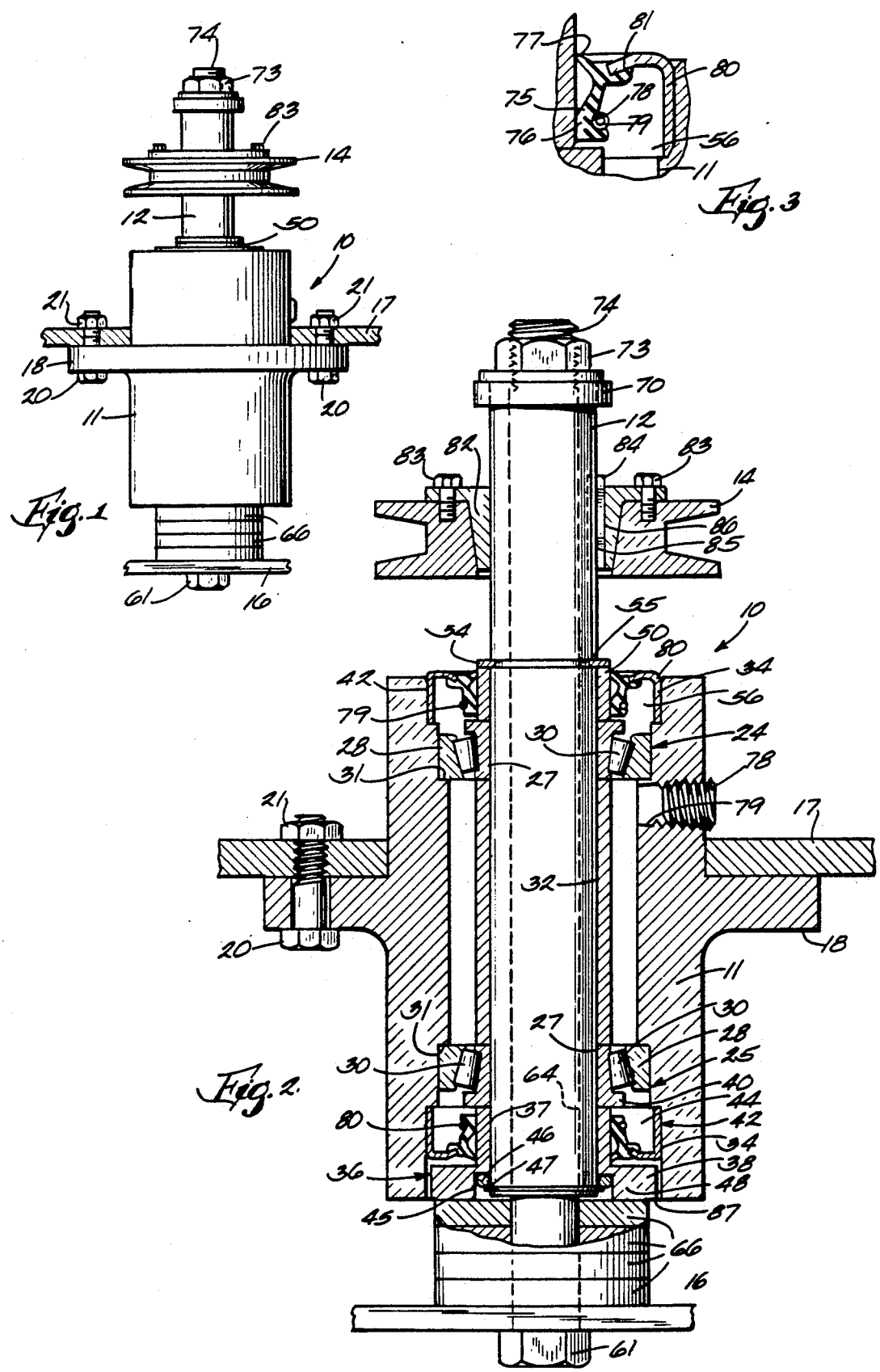

SPINDLE ASSEMBLY

BACKGROUND OF THE INVENTION

This invention relates to lawn mowers and more particularly to a spindle assembly for rotatably supporting the cutter blade of a rotary-type lawn mower.

In rotary-type lawn mowers, spindle assemblies are commonly used to rotatably support the cutter blade and couple the same to the engine. Prior art spindle assemblies typically include a spindle rotatably supported by bearings in a housing mounted on a cutter deck. The bearings are normally lubricated by grease. A pulley mounted on the spindle above the housing is coupled to the mower engine by a belt and pulley assembly. The cutter blade is fixed to the lower end of the spindle and below the cutter deck.

Spindle assemblies are normally exposed to an abusive environment of abrasive and corrosive materials, such as dirt, debris, sand and water. This is normally not a significant problem for residential-type lawn mowers which are designed to last a few hundred hours, which is typical for homeowner application with an expected life of five to seven years. While commercial lawn mowers are also expected to have a useful life of five to seven years, they are used from 600 to 1,000 hours per year, for a total life of 5,000 to 10,000 hours. As a result, frequent maintenance is required for spindle assemblies of prior art commercial-type lawn mowers. For example, to maintain cleanliness in the spindle assemblies, operators are required to grease the internal components anywhere from daily to at least once a week. Even with such short maintenance cycles, frequent repair is commonly required for prior art spindle assemblies used in commercial lawn mower applications.

SUMMARY OF THE INVENTION

An object of the invention is to provide a new and improved spindle assembly for rotary lawn mowers.

Another object of the invention is to provide a spindle assembly for rotary lawn mowers which requires little maintenance.

A further object of the invention is to provide a spindle assembly for rotary lawn mowers and having an extended useful life.

Still another object of the invention is to provide a spindle assembly for rotary lawn mowers which is relatively easy to assemble and maintain.

These and other objects and advantages of the instant invention will become more apparent from the detailed description thereof taken with the accompanying drawings.

In general terms, the invention comprises a spindle assembly for the cutter blade of a rotary lawn mower including an open-ended, generally cylindrical housing mounted on the lawn mower with its axis generally vertical. A spindle is disposed coaxially within the housing and extends from the open opposite ends thereof. First and second roller bearing means are disposed in a spaced apart relation within the housing and between the spindle and the housing for rotatably supporting the spindle relative to the housing. A first lip seal means is disposed above the first bearing means and between the housing and the spindle for sealing the upper end of the housing and a second lip seal means is disposed below the second bearing and between the housing and the spindle for sealing the lower end of the housing, and bushing means is disposed below the second lip seal and has an outer periphery in proximity to the inner surface of the housing and spaced from the bearing to define an annular cavity for receiving the second lip seal. Rotary cutter blade means is fixed to the lower end of the spindle and coupling means is mounted on the spindle above the housing and is adapted to be connected by a belt to a rotary power source.

BRIEF DESCRIPTION OF THE DRAWINGS

FIG. 1 shows a spindle assembly for rotary-type lawn mowers which incorporates the present invention; and FIG. 2 is a partial sectional view of the spindle assembly shown in FIG. 1.

FIG. 3 is a sectional view of a portion of the spindle assembly shown in FIGS. 1 and 2.

DETAILED DESCRIPTION OF THE PREFERRED EMBODIMENT

The drawings show a spindle assembly 10 according to the preferred embodiment of the invention to include a hollow, open-ended, generally cylindrical housing 11 which rotatably supports a spindle 12 extending axially therethrough. A pulley 14 is mounted on and is coupled to the spindle 12 above the housing 11 and a cutter blade 16 is fixed to its lower end. The housing 11 is supported in a suitable opening formed in the mower's cutter deck 17 by means of a radial flange 18 which is secured to deck 17 by bolts 20 and nuts 21. Those skilled in the art will appreciate that there may be one or more cutter blades 16 disposed below the cutter deck 17 and each is mounted on a spindle assembly 10 which is coupled to the mower's engine (not shown) by a drive belt (not shown) which engages each pulley 14 for rotating the cutter blades 16. It can be seen that the lower end of the spindle assembly 10 is located below the cutter deck 17 and will thus be subject to an environment which includes dirt, water, sand, debris and other corrosive and abrasive materials.

FIG. 2 shows the spindle assembly 10 according to the preferred embodiment of the invention in greater detail. In particular, the spindle 12 is shown to be rotatably mounted in housing 11 by means of tapered roller bearing assemblies 24 and 25, each of which includes an inner race 27 (known as the "cone"), an outer race 28 (known as the "cup"), and a plurality of tapered rollers 30 disposed therebetween. The bearing cup 28 abuts shoulders 31 formed by increasing the inner diameter at the upper and lower ends of housing 11. In addition, a spacer sleeve 32 is disposed in surrounding relation to spindle 12 and between the bearings 24 and 25 for maintaining spacing. The bearing cone 27 may be loosely assembled to the spindle 12, while the bearing cup 28 is prevented from rotating relative to the housing 11 in any suitable manner, such as by press fitting.

A lower bushing 36 having a reduced diameter neck portion 37 is loosely assembled to the lower end of spindle 12. The bushing 36 also includes a skirt portion 38 disposed in surrounding relation to and spaced from the lower end of spindle 12 and extending from the lower end of housing 11 to define an annular space 40 and a shoulder 42. Disposed in the annular space between the outer surface of the neck portion 37 of bushing 36 and the inner surface 34 of housing 11 and bridging the gap therebetween is a first lip seal 44. An O-ring seal 46 is located below the shoulder 45 and in surrounding relation to the spindle 12. Immediately below the O-ring seal 46, a snap ring 47 is positioned in an annular groove 48 formed in the outer surface of spindle 12.

At the upper end of housing 11, an upper bushing 50 is loosely assembled on spindle 12. A second snap ring 54 is received in an annular groove 55 formed in spindle 12 to hold the components in position. Located between the outer surface of the bushing 50 and the inner surface 34 of housing 11 is a second lip seal 56 which is identical to the first lip seal 44.

The cutter blade 16 is fixed to the lower end of spindle 12 by means of a bolt 61 which extends through a suitable opening in blade 16 and is received within an internal bore 64 formed in spindle 12. A plurality of annular spacers 66 are positioned around spindle 12 and between the lower end of bushing 36 and blade 16 to fix the blade at the desired height.

An externally-threaded pipe plug 78 is received in a threaded opening 79 extending through the wall of housing 11 and communicating with the hollow interior thereof. This permits the housing 11 to be filled with a heavy oil or any other liquid lubricant which lubricates the bearings 24 and 25. The lip seals 44 and 56 prevent the egress of lubricant from within the housing 11. Also, while the top lip seal 56 is flush with the upper end of the housing 11, the lower lip seal 44 is in a protected position within a space defined by the housing 11 and the bushing 36.

The lip seals 44 and 56 are identical so only the seal 56 as shown in FIG. 3 will be discussed in detail for the sake of brevity. In particular, lip seal 56 includes an annular sealing ring 75 formed of rubber or a rubber-like material such as neoprene. Ring 75 is disposed within the gap between the housing 11 and the stop ring 50 and has first and second annular edges 76 and 77 which engages the outer surface of the bushing 50. There is also a groove 78 in one side of ring 75 for receiving a coil spring 79 which urges the edges 76 and 77 into tight sealing engagement with the surface of bushing 50. In addition, ring 75 also includes an annular metallic shell 80 which is fixed to ring 75 by means of an edge which extends into a groove 81 formed in member 75. The outer surface of housing 81 engages the inner surface 34 of housing 11. Preferably, the upper surface of the second lip seal 56 is flush with the upper surface of housing 11.

The pulley 14 includes a tapered hub 82 to which it is coupled by screws 83 and which is received on the spindle 12 above housing 11. The pulley hub 82 is coupled to spindle 12 by means of a key 84 received in aligned slots 85 and 86 formed in the outer surface of spindle 12 and the inner surface of hub 82.

In assembly, bearing cups 28 are first pressed into housing 11 and sleeve 32 is inserted into housing 11. Bearing cones 27 are then installed and the shells 80 of lip seals 44 and 56 are pressed into housing 11. The snap ring 54 and bushing 50 are then assembled to spindle 12, and the assembly inserted into housing 11. The bottom bushing 38 may then be installed and the 0-ring 46 and the snap ring 47 positioned. The entire spindle housing assembly 10 is fastened to cutter deck 17, after which pulley 14 and key 81 is assembled to spindle 12. Finally, bolt 61 is inserted through cutter blade 16, spacers 66, spindle housing assembly 10, spacer 70 and nut 73 onto bolt thread 74. The housing 11 is partially filled with an oil-type lubricant through port 74, and the plug 78 is installed.

The spindle assembly described above only requires a minimum of maintenance. For example, the lip seals and liquid lubricant eliminate the necessity for frequent applications of grease.

While only a single embodiment of the invention has been illustrated and described, it is not intended to be limited thereby, but only by the scope of the appended claims.

I claim:

1. A spindle assembly for the cutter blade of a rotary lawn mower including an open-ended, generally cylindrical housing mounted on said lawn mower with its axis generally vertical and having an inner surface, a spindle disposed coaxially within said housing and extending from the open opposite ends thereof, said spindle being spaced from the inner surface of said housing to define a gap therebetween, first and second bearing means disposed in a spaced apart relation within said housing and respectively adjacent the lower and upper ends thereof and between said spindle and said housing for rotatably supporting said spindle relative to said housing, first annular lip seal means disposed in surrounding relation to said spindle and below said first bearing means for sealing the lower end of said housing and a second annular lip seal means disposed in surrounding relation to said spindle and above said second bearing means for sealing the upper end of said housing, and lower bushing means disposed below said first lip seal means and having an outer periphery in proximity to the inner surface of said housing for protecting said first lip seal means, rotary cutter blade means fixed to the lower end of said spindle and a coupling means adjacent the upper end thereof and adapted to be connected to a rotary power source.

2. The spindle assembly set forth in claim 1 wherein the gap between said spindle and said housing being filled with a liquid lubricant.

3. The spindle assembly set forth in claim 1 wherein the first and second bearing means comprise roller bearings.

4. The spindle assembly set forth in claim 1 and including a bushing disposed on said spindle and located below said second lip seal means, and a third sealing means disposed in surrounding relation to said spindle and below said bushing means.

5. The spindle assembly set forth in claim 4 and further including a first snap ring means disposed on said spindle and below said third sealing means and a second snap ring means on said spindle and above said second lip seal means.

6. The spindle assembly set forth in claim 2 wherein the first and second bearing means comprise roller bearings.

7. The spindle assembly set forth in claim 6 and including a bushing disposed on said spindle and located below said second lip seal means, and a third sealing means disposed in surrounding relation on said spindle and below said bushing means.

8. The spindle assembly set forth in claim 7 and including a first snap ring means disposed on said spindle and below said third sealing means and a second snap ring means on said spindle and above said second lip seal means.

9. The spindle assembly set forth in claim 2 wherein there is a third sealing means which comprises an annular sealing member engaging said spindle, an upper bushing means disposed in surrounding relation to said spindle and adjacent the upper end of said housing, said first and second lip seal means each comprising a resilient member engaging said lower and upper bushing means, respectively, each of said first and second sealing means also including a shell which engages said housing and said resilient means and a spring means disposed in surrounding relation to said resilient means for biasing said resilient means into engagement with said bushings, said second lip seal means being disposed below the upper end of said housing.

10. The spindle assembly set forth in claim 9 and further including a first snap ring means disposed on said spindle and below said third sealing means and a second snap ring means on said spindle and above said second lip seal means.

11. The spindle assembly set forth in claim 10 wherein the first and second bearing means comprise roller bearings.

12. The spindle assembly set forth in claim 11 and including a bushing means disposed on said spindle and located below said second lip seal means, said third sealing means disposed in surrounding relation on said spindle and below said bushing means.

13. A spindle assembly for the cutter blade of a rotary lawn mower including an open-ended, generally cylindrical housing mounted on said lawn mower with its axis generally vertical and having an inner surface, a spindle disposed coaxially within said housing and extending from the open opposite ends thereof, said spindle being spaced from the surface of said housing to define a gap therebetween, first and second bearing means disposed in a spaced apart relation within said housing and respectively adjacent the lower and upper ends thereof and between said spindle and said housing for rotatably supporting said spindle relative to said housing, first seal means disposed below said first bearing means and in surrounding relation to said spindle for sealing the lower end of said housing and second seal means disposed above said second bearing means and in surrounding relation to said spindle for sealing the upper end of said housing, and bushing means disposed below said first seal means and having an outer periphery in proximity to the inner surface of said housing for protecting said first seal means, rotary cutter blade means fixed to the lower end of said spindle and a coupling means adjacent to the upper end thereof and adapted to be connected to a rotary power source, the gap between said spindle and said housing being substantially filled with a liquid lubricant.

14. The spindle assembly set forth in claim 9 wherein the first and second bearing means comprise roller bearings.

15. The spindle assembly set forth in claim 10 and including a bushing disposed on said spindle and located below said second seal means, and a third seal means disposed in surrounding relation on said spindle and below said bushing means.

16. The spindle assembly set forth in claim 14 and further including a first snap ring means disposed on said spindle and below said third seal means and a second snap ring means on said spindle and above said second seal means.

17. A spindle assembly for the cutter blade of a rotary lawn mower including an open-ended housing mounted on said lawn mower with its axis generally vertical and having an inner surface, said spindle being disposed coaxially within said housing and extending from the open opposite ends thereof, said spindle being spaced from the inner surface of said housing to define a gap therebetween, first and second bearing means disposed in a spaced apart relation within said housing and respectively adjacent the lower and upper ends thereof and between said spindle and said housing for rotatably supporting said spindle relative to said housing, first seal means disposed below said first bearing means and in surrounding relation to said spindle for sealing the lower end of said housing and second seal means disposed above said bearing means and in surrounding relation to said spindle for sealing the upper end of said housing, and means disposed below said first seal means and having an outer periphery in proximity to the inner surface of said housing for protecting said first seal means, rotary cutter blade means fixed to said spindle below said housing and a coupling means coupled to said spindle and above said housing and adapted to be connected to a rotary power source, the gap between said spindle and said housing being substantially filled with a lubricant.

* * * * *